United States Patent
Winkelmann et al.

(10) Patent No.: US 10,994,827 B2
(45) Date of Patent: May 4, 2021

(54) WING ARRANGEMENT FOR AN AIRCRAFT

(71) Applicants: Airbus Operations GmbH, Hamburg (DE); Airbus Operations Ltd, Bristol (GB)

(72) Inventors: Christoph Winkelmann, Hamburg (DE); Wilfried Ellmers, Hamburg (DE); Stephen Briancourt, Bradley Stoke Bristol (GB); David Brakes, Bishopston Bristol (GB)

(73) Assignees: AIRBUS OPERATIONS GMBH, Hamburg (DE); AIRBUS OPERATIONS LTD., Bristol (GB)

( * ) Notice: Subject to any disclaimer, the term of this patent is extended or adjusted under 35 U.S.C. 154(b) by 450 days.

(21) Appl. No.: 15/979,806

(22) Filed: May 15, 2018

(65) Prior Publication Data
US 2018/0334238 A1 Nov. 22, 2018

(30) Foreign Application Priority Data

May 18, 2017 (EP) .................................. 17171842

(51) Int. Cl.
*B64C 3/54* (2006.01)
*B64C 3/56* (2006.01)
*F16B 45/02* (2006.01)

(52) U.S. Cl.
CPC ............... *B64C 3/546* (2013.01); *B64C 3/56* (2013.01); *F16B 45/02* (2013.01)

(58) Field of Classification Search
CPC ............ B64C 3/56; B64C 3/546; F15B 45/02
USPC ........................................................ 244/49
See application file for complete search history.

(56) References Cited

U.S. PATENT DOCUMENTS 2,375,423 A * 5/1945 Lobelle .................... B64C 3/54
                                                          244/218
2,468,425 A 4/1949 David et al.
4,717,093 A 1/1988 Rosenberger et al.
(Continued)

FOREIGN PATENT DOCUMENTS

CA 2809451 A1 * 12/2013 ............... B64C 3/56
CA 2828726 A1 * 4/2014 ............... B64C 3/56
(Continued)

OTHER PUBLICATIONS

European Search Report, dated Oct. 20, 2017, priority document.

*Primary Examiner* — Christopher P Ellis
(74) *Attorney, Agent, or Firm* — Greer, Burns & Crain, Ltd.

(57) ABSTRACT

A wing arrangement for an aircraft, comprising a wing having a base section and a tip section pivotably connected to base section such that the tip section is pivotable about a pivot axis between a deployed position and a stowed position. The wing arrangement also comprises a latching arrangement which includes an engagement portion, a latching actuator selectively movable between a first actuator position and a second actuator position, an elastically deformable structure, and a latching element. When the tip section is pivoted from the stowed or deployed position into an engagement position, the elastically deformable structure is initially deformed, and as the tip section pivots further into the deployed or stowed position, the elastic deformation of the elastically deformable structure decreases.

14 Claims, 8 Drawing Sheets

(56) References Cited

U.S. PATENT DOCUMENTS

| | | | | |
|---|---|---|---|---|
| 5,350,135 | A * | 9/1994 | Renzelmann | B64C 3/56 244/49 |
| 5,372,336 | A * | 12/1994 | Paez | B64C 3/56 244/49 |
| 5,379,969 | A * | 1/1995 | Marx | B64C 3/56 244/49 |
| 5,427,329 | A * | 6/1995 | Renzelmann | B64C 3/56 244/49 |
| 5,558,299 | A * | 9/1996 | Veile | B64C 3/56 244/49 |
| 6,446,906 | B1 * | 9/2002 | Voigt | B64C 9/36 244/3.27 |
| 7,059,561 | B2 * | 6/2006 | Trouillot | F42B 10/14 244/3.28 |
| 9,580,166 | B2 * | 2/2017 | Good | B64C 3/56 |
| 10,227,128 | B2 * | 3/2019 | Korya | B64C 3/56 |
| 2009/0045288 | A1 * | 2/2009 | Nakamura | B64C 1/1415 244/129.5 |
| 2010/0019080 | A1 * | 1/2010 | Schweighart | B64C 3/56 244/49 |
| 2010/0051742 | A1 * | 3/2010 | Schweighart | B64C 3/56 244/49 |
| 2013/0341467 | A1 * | 12/2013 | Sakurai | B64C 3/56 244/201 |
| 2014/0117151 | A1 | 5/2014 | Fox et al. | |
| 2015/0336657 | A1 * | 11/2015 | Townsend | B64C 3/56 244/49 |
| 2016/0090170 | A1 * | 3/2016 | Thompson | B64C 3/56 701/3 |
| 2016/0332721 | A1 | 11/2016 | Hancock | |
| 2016/0332723 | A1 | 11/2016 | Korya et al. | |
| 2017/0113780 | A1 * | 4/2017 | Boye | B64C 23/072 |
| 2017/0137111 | A1 * | 5/2017 | Harding | B64C 3/56 |
| 2017/0349296 | A1 * | 12/2017 | Moy | B64C 3/56 |
| 2017/0355441 | A1 * | 12/2017 | Winkelmann | F15B 9/10 |
| 2018/0001992 | A1 * | 1/2018 | Kracke | B64C 3/56 |
| 2019/0359312 | A1 * | 11/2019 | Lorenz | B64C 3/56 |
| 2020/0001974 | A1 * | 1/2020 | Lorenz | B64C 3/56 |
| 2020/0039630 | A1 * | 2/2020 | Kamila | B64C 23/065 |
| 2020/0079491 | A1 * | 3/2020 | Gruner | B64C 3/50 |

FOREIGN PATENT DOCUMENTS

| | | | | |
|---|---|---|---|---|
| CA | 2918094 | A1 * | 7/2016 | B64C 23/072 |
| CN | 201362322 | | 12/2009 | |
| EP | 0214888 | | 3/1987 | |
| EP | 2730499 | | 5/2014 | |
| EP | 3093231 | | 11/2016 | |
| EP | 3093231 | A1 * | 11/2016 | B64C 3/56 |
| EP | 3093233 | | 11/2016 | |
| EP | 3287364 | A1 * | 2/2018 | B64C 3/56 |
| EP | 3575204 | A1 * | 12/2019 | B64C 3/56 |

\* cited by examiner

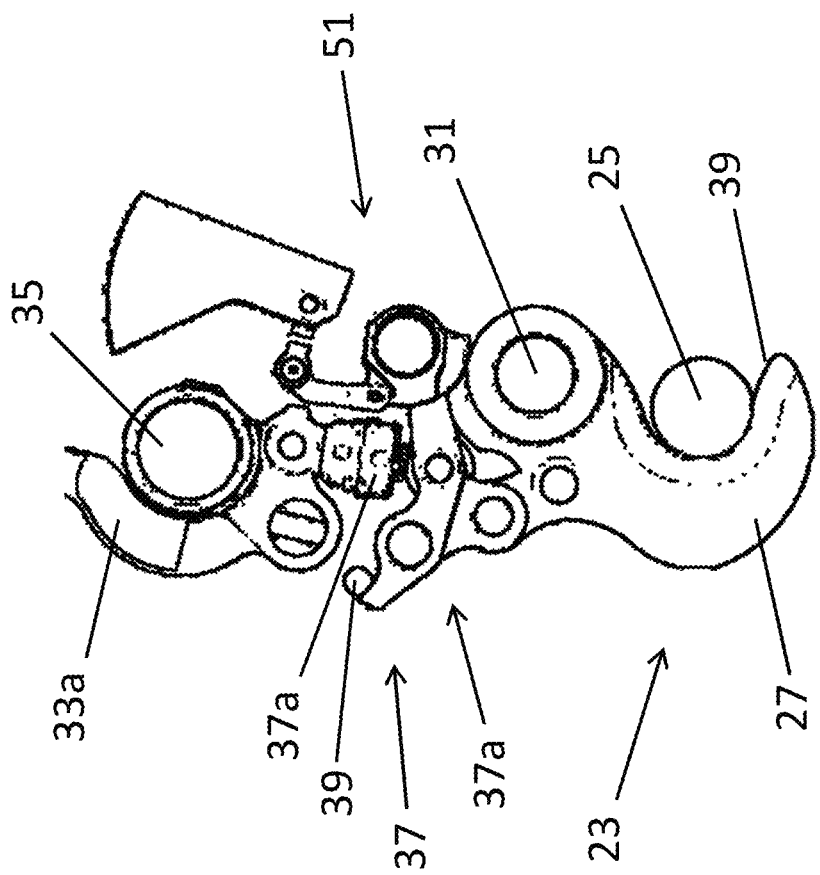
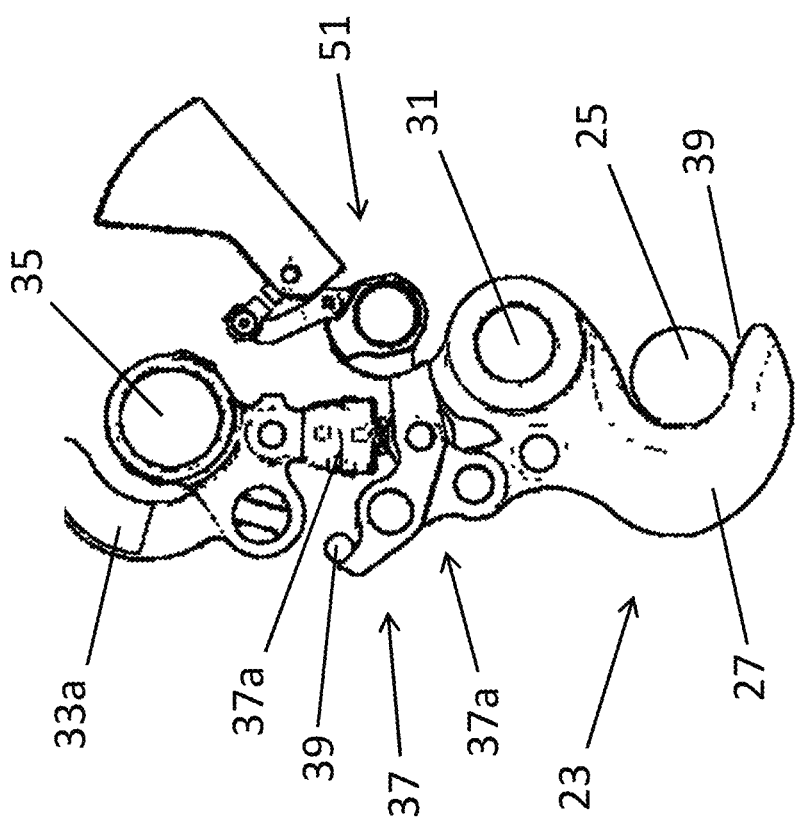
Fig. 3c
Fig. 3b

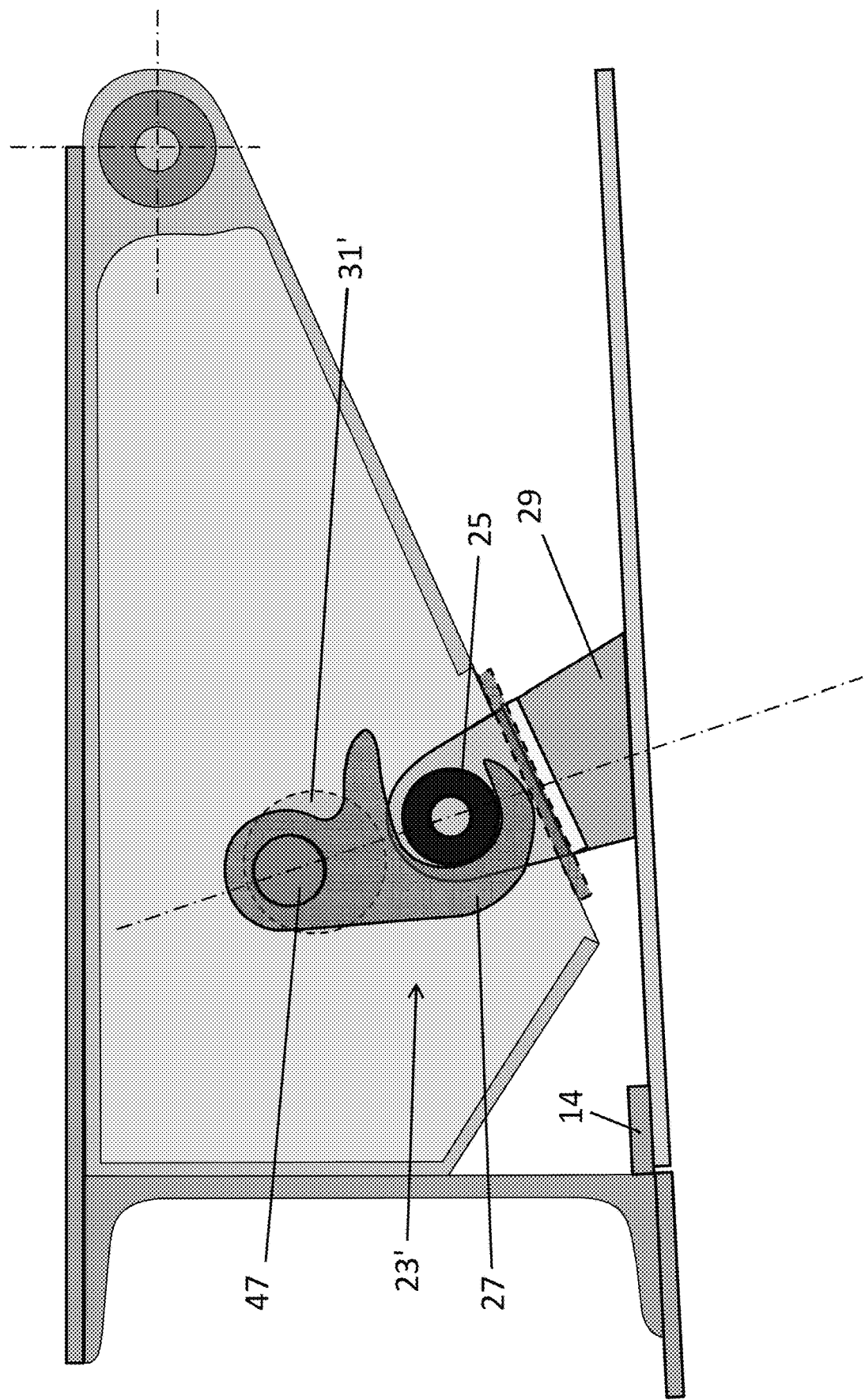

WING ARRANGEMENT FOR AN AIRCRAFT

CROSS-REFERENCES TO RELATED APPLICATIONS

This application claims the benefit of the European patent application No. 17171842.2 filed on May 18, 2017, the entire disclosures of which are incorporated herein by way of reference.

BACKGROUND OF THE INVENTION

The present invention relates to a wing arrangement for an aircraft comprising a wing having a base section with a first end portion and an opposite second end portion, wherein the first end portion is adapted to be secured to the fuselage of an aircraft, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position.

The aspect ratio, i.e., the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft, is to provide for a foldable wing construction which allows the pivotable movement of an outboard end portion of the wing between a deployed position, in which the wing has its normal flight configuration, and a stowed position, in which the wing has a folded configuration and the wingspan is decreased as compared to the deployed position. It is necessary to provide a latching device which is able to safely retain the outboard end portion in the deployed position or in the stowed position or in both positions, as long as the respective position is desired.

SUMMARY OF THE INVENTION

It is an object of the present invention to provide a wing arrangement having a foldable wing which is safe and reliable in operation and at the same time of a simple construction.

According to the present invention, a wing arrangement for an aircraft is provided. The wing arrangement comprises a wing having a base section and a tip section.

The base section has a first end portion, which is adapted to be secured to the fuselage of an aircraft, and an opposite second end portion. Thus, when the wing is mounted to a fuselage of an aircraft at its first end portion the second end portion of the base section is remote from the fuselage, i.e., a terminal end of the first end portion constitutes the inboard end of the base section and of the entire wing and an opposite terminal end of the second end portion constitutes the outboard end of the base section.

The tip section has a third end portion and an opposite fourth end portion. The third end portion is pivotably connected to the second end portion such that the tip section is pivotable, e.g., by means of one or more tip section actuators, about a tip section pivot axis between a first tip section position and a second tip section position. The first tip section position is a deployed position or a stowed position, in which the spanwise length of the wing is smaller than in the deployed position. In other words, when two of the wings are mounted to opposite sides of a fuselage of an aircraft, the length of the shortest straight line between the outermost wingtips of the two wings is larger—and preferably maximized—in the deployed position than in the stowed position, i.e., the length of the wing measured along the y-axis or pitch axis of the aircraft is larger—and preferably maximized—in the deployed position than in the stowed position. In particular, the distance between the first end portion and the fourth end portion may be larger—and preferably maximized—in the deployed position than in the stowed position. The second tip section position is the other one of the deployed position and the stowed position. Thus, for example, the first tip section position may be the deployed position, and then the second tip section position is the stowed position.

Thus, when the wing is mounted to a fuselage of an aircraft at its first end portion, and at least in the deployed position of the tip section, the third end portion of the tip section is spaced from the fuselage by the base section and the fourth end portion is the outermost portion of the wing, i.e., a terminal end of the third end portion constitutes the inboard end of the tip section and an opposite terminal end of the fourth end portion constitutes the outboard end of the tip section and of the entire wing.

The first tip section position is defined by a first tip section stop mechanism. Thus, a part of the tip section abuts the first tip section stop mechanism when the tip section reaches the first tip section position upon being moved from the second tip section position to the first tip section position, and is movable out of abutment towards the second tip section position. The second tip section position may preferably be defined in a similar manner by a second tip section stop mechanism or, for example, by suitable configuration of one or more tip section actuators adapted to pivot the tip section about the tip section pivot axis between the first tip section position and the second tip section position. In case of provision of a second tip section stop mechanism, a part of the tip section abuts the second tip section stop mechanism when the tip section reaches the second tip section position upon being moved from the first tip section position to the second tip section position, and is movable out of abutment towards the first tip section position.

It is to be noted that, in case the wing includes a wing tip device, the tip section may be identical to the wing tip device, but that it is preferred that the tip section comprises the wing tip device and additionally a further portion of the wing at the inboard side of the wing tip device. In this regard, in the usual manner wing tip devices are understood as devices or wing sections installed at the outermost end of a wing and being adapted to increase the effective aspect ratio of a wing without materially increasing the wingspan and to reduce drag by partially recovering the energy of tip vortices.

The wing arrangement further comprises a latching arrangement. The latching arrangement comprises one or more engagement portions which are provided on one of the tip section and the base section, preferably the tip section. For example, the one or more engagement portions may be part of, integrally formed with or fixedly secured to the one of the tip section and the base section. Each of the engagement portions may comprise two or more separate subportions.

The latching arrangement also comprises one or more latching actuators, preferably on or mounted on the other one of the tip section and the base section, in particular the base section. Each such latching actuator, which may be, e.g., a hydraulic actuator or an electric actuator, is selectively movable between a first actuator position and a second actuator position.

Moreover, the latching arrangement comprises an elastically deformable structure and one or more latching elements. Each such latching element has a hook-shaped portion and may be, in particular, a hook or hook-shaped. Further, each of the latching elements is secured to the other one of the tip section and the base section—preferably the base section—to be pivotable with respect thereto about a latching element pivot axis. In this regard, being pivotably secured means that the latching element is pivotable with respect to at least a portion of the remainder of the tip section and the base section, respectively. Each of the latching elements is further selectively movable between different positions by moving the at least one latching actuator between the first actuator position and the second actuator position. For this purpose, the one or more latching elements are operatively or kinematically coupled to the one or more latching actuators. For example, the one or more latching elements may be coupled to only one latching actuator. However, for reasons of redundancy each of the one or more latching elements is preferably coupled to two or more latching actuators.

The above-mentioned components of the wing arrangement are configured such that when the one or more latching actuators are in the first actuator position, the one or more latching elements are positioned such that the tip section is pivotable between the second tip section position and an engagement position, which is located between the second tip section position and the first tip section position or which is equal to the first tip section position. The first actuator position may preferably correspond to a defined release position of the one or more latching elements. For example, the one or more latching elements may be in the release position. However, it is also possible that it is necessary to move the one or more latching actuators into the first actuator position and the tip section into a predetermined position between the second and first tip section positions to bring the one or more latching elements into the release position by a contact between the one or more latching elements and the one or more engagement portions. Then, the one or more latching elements may force the tip section into the first tip section position when moving from the release position into the latching position.

The above-mentioned components of the wing arrangement are further configured such that when the at least one latching actuator is in the second actuator position and the tip section is in the first tip section position the one or more latching elements are in a latching position in which an engagement surface of each of the latching elements engages one of the engagement portions such that the engagement surface applies a force to the respective engagement portion, which force biases the tip section against the first tip section stop mechanism, and such that the tip section is prevented from moving towards the second tip section position. The engagement surface is preferably an interior surface portion of the hook-shaped portion, in particular of a claw portion of the hook-shaped portion.

When the tip section is pivoted from the second tip section position into the engagement position, with the one or more latching actuators in the first actuator position, and the one or more latching actuators are subsequently moved from the first actuator position into the second actuator position, the engagement surface of the one or more latching elements engages the one or more engagement portions when the one or more latching actuators reach a third actuator position between the first and second actuator positions. Upon further movement of the one or more latching actuators, the engagement surface of the one or more latching elements applies a force to the respective engagement portion which forces the tip section towards and against the first tip section stop mechanism. Over at least part of the movement of the one or more latching actuators from the third actuator position into a fourth actuator position, the tip section abuts the first tip section stop mechanism, and the force with which the engagement surface biases the tip section against the first tip section stop mechanism increases while the elastically deformable structure is increasingly deformed, e.g., from a first deformation value to a second, larger deformation value. The fourth actuator position may be equal to the second actuator position. Alternatively, the fourth actuator position may be between the third and second actuator positions and, thus, spaced or different from both the third actuator position and the second actuator position. In the case of the fourth actuator position being between the third and second actuator positions, upon still further movement of the one or more latching actuators from the fourth actuator position into the second actuator position the force with which the engagement surface biases the tip section against the first tip section stop mechanism decreases while the elastic deformation of the elastically deformable structure decreases, e.g., to a third deformation value smaller than the second deformation value and, for example, larger than the first deformation value.

When following the above process, the first to fourth actuator positions of the at least one latching actuator can be briefly summarized as follows:

In the first actuator position, the tip section is pivotable from the second tip section position into the engagement position and vice versa. It could therefore also be referred to as a release position of the one or more latching actuators.

In the second actuator position, an engagement surface of each of the one or more latching elements engages one of the engagement portions, thereby applying a force to the respective engagement portion biasing the tip section against the first tip section stop mechanism and latching the tip section in the first tip section position. It could therefore also be referred to as a latching position of the one or more latching actuators.

In the third actuator position, the engagement surface of the one or more latching elements first engages the one or more engagement portions when the one or more latching actuators are moved from the first actuator position towards the second actuator position. Thus, with respect to this movement it could also be referred to as the position of the initial engagement of the one or more latching elements with the respective engagement portion, i.e., as initial engagement position. The third actuator position is located between the first and second actuator positions.

The fourth actuator position is identical to the second actuator position or is located between the third actuator position and the second actuator position. It is a position of maximum biasing force and maximum deformation of the elastically deformable structure. Thus, if the fourth actuator position is located between the third actuator position and the second actuator position, when moving the one or more latching actuators from the fourth actuator position towards the second actuator position the biasing force and deformation decrease.

Of course, the above process is reversed when moving the one or more latching actuators from the second actuator position into the first actuator position, thereby moving the one or more latching elements out of the latching position into a position in which the tip section is able to move towards the second tip section position, e.g., the above-mentioned release position of the one or more latching elements.

The wing arrangement having the above construction is of a particularly simple construction. Further, due to the biasing force applied by the one or more latching elements to the one or more engagement portions and, thus, to the tip section and biasing the tip section into the first tip section position against the first tip section stop mechanism while the elastically deformable structure is deformed, oscillations and vibrations of the tip section in the first tip section position are reliably prevented. At the same time, a proper sealing of the junction or transition area between the tip section and the base section can be realized in a simple manner. Moreover, in embodiments in which the fourth actuator position is located between the third actuator position and the second actuator position, the one or more latching elements maintain their latching position even if the latching arrangement is deenergized, i.e., in the case of power loss when the latching actuators—and optional locking actuators described in detail further below—are no longer powered. This is due to the elastically deformable structure and the decrease of its elastic deformation and of the biasing force during the portion of the actuator movement between the fourth actuator position and the second actuator position, because the one or more latching actuators need to again elastically deform the elastically deformable structure when moving out of the second actuator position. Alternatively, and also in embodiments in which the fourth actuator position is equal to the second actuator position, the one or more latching actuators and/or their coupling to the one or more latching elements may also be configured to be non-backdrivable in order to achieve that the one or more latching elements maintain their latching position even if the latching arrangement is deenergized, i.e., in the case of power loss when the latching actuators—and optional locking actuators described in detail further below—are no longer powered.

In a preferred embodiment, the latching arrangement comprises a rotatable latching shaft to which the one or more latching elements and the one or more latching actuators are coupled, such that when moving the one or more latching actuators between the first and second actuator positions the latching shaft is rotated, thereby effecting the movement of the one or more latching elements between the different positions. Thus, the latching shaft is common to all of the one or more latching elements.

In a preferred embodiment, the elastically deformable structure comprises, or is, a separate element, for example provided, along a flow of force, between the one or more latching elements and each of the one or more latching actuators. Each such separate element may be or comprise, e.g., a spring element. Alternatively or additionally, the elastically deformable structure comprises, or is, a portion of the tip section or the base section. It may then comprise, e.g., the engagement portion or portions and/or a part of a structure of the tip section and the base section, respectively.

In a preferred embodiment, the components of the wing arrangement are configured and disposed such that during movement of the one or more latching actuators from the first actuator position into the second actuator position, the latching element pivot axis of the one or more latching elements moves along a predetermined path, which is preferably curved but may also be straight. In this regard, the curved path may, for example, correspond to a section of a circle or may be any other suitable type of non-straight path. Accordingly, the one or more latching elements as a whole carry out a translatory movement defined by the aforementioned path. The path is arranged such that during movement of the one or more latching actuators from the third actuator position into the fourth actuator position, the engagement surface of the one or more latching elements moves in a direction of the force applied by it to the respective engagement portion and forcing the tip section towards and against the first tip section stop mechanism. In other words, the movement has a component parallel—or nominally parallel—to the direction of the force and in the direction of the force. Further, if the fourth actuator position is between the third and second actuator positions, during movement of the one or more latching actuators from the fourth actuator position into the second actuator position, the engagement surface of the one or more latching elements moves in a direction opposite that force. In other words, the movement then has a component parallel—or nominally parallel—to but opposite to the direction of the force. Preferably, if the latching arrangement also comprises a latching shaft as described above, the pivotable securing of the one or more latching elements to the other one of the tip section and the base section mentioned above is realized by the one or more latching elements being pivotably secured to the latching shaft such that they are pivotable relative to the latching shaft. The latching shaft is then part of the tip section and the base section, respectively. The latching element pivot axis is parallel—or nominally parallel—to but offset or spaced from the axis of rotation of the latching shaft, i.e., the longitudinal axis thereof, so that rotation of the latching shaft about its axis of rotation effects the movement of the latching element pivot axis along the aforementioned path. However, in particular, in embodiments in which the aforementioned path is curved, but not curved about an axis, or is straight, the path or the movement along the path may also be achieved by other means, such as, for example, a four-bar link hinge adapted and arranged to provide for the translatory movement along the path. The latter arrangement may offer better kinematics for tip-to-wing separation.

In an alternative preferred embodiment, which also comprises a latching shaft as described above, the one or more latching elements are rigidly secured to the latching shaft such that the latching element pivot axis coincides with the axis of rotation of the latching shaft and upon rotation of the latching shaft about its axis of rotation the one or more latching elements pivot about the latching element pivot axis, i.e., the one or more latching elements rigidly rotate together with the latching shaft.

In a preferred embodiment, the latching arrangement further comprises a latching element stop arrangement which defines the latching position of the one or more latching elements. Upon moving the one or more latching actuators from the first actuator position to the second actuator position the one or more latching elements abut the latching element stop arrangement, i.e., reach their latching position, when the one or more latching actuators are between the third and fourth actuator positions or in the fourth actuator position. If the fourth actuator position is between the third and second actuator positions, further movement of the one or more latching actuators into the second actuator position then does not effect further movement of the one or more latching elements. Rather, the deformation of the elastically deformable structure may preferably change and, for example, decrease.

In a preferred embodiment, the one or more engagement portions move along the respective engagement surface during at least part of the movement of the one or more latching actuators from the third actuator position into the second actuator position, e.g., until the one or more latching elements reach their latching position. The engagement surface of the one or more latching elements comprises a rising ramp portion which is shaped and arranged such that during at least part of the movement along the engagement surface the engagement portion moves up a rising ramp provided by the rising ramp portion. In this way, the tip section is forced towards and against the first tip section stop mechanism.

In a preferred embodiment, in which the fourth actuator position is between the third and second actuator positions, the one or more engagement portions move along the respective engagement surface during at least part of the movement of the one or more latching actuators from the third actuator position into the second actuator position, including at least part of the movement from the fourth actuator position into the second actuator position. The engagement surface of the one or more latching elements comprises a falling ramp portion which is shaped and arranged such that during at least part of the movement of the one or more latching actuators from the fourth actuator position into the second actuator position, the engagement portion moves along the engagement surface down a falling ramp provided by the falling ramp portion. In this way, the biasing force exerted by the one or more latching elements is relaxed.

In a preferred embodiment, the wing arrangement further comprises a locking mechanism which has one or more locking elements. Each such locking element is selectively movable between a locking position and an enabling position. When the one or more latching elements are in the latching position and the one or more locking elements are moved from the enabling position to the locking position, the one or more locking elements engage the one or more latching elements or a component secured thereto and prevent the one or more latching elements from moving out of the latching position. When the one or more latching elements are in the latching position and the one or more locking elements are moved from the locking position to the enabling position, the one or more latching elements are able to move out of the latching position. The locking mechanism also comprises one or more locking actuators which are operable to move the one or more locking elements between the locking position and the enabling position.

In this embodiment it is further preferred if the one or more locking actuators comprise one or more first, e.g., hydraulic or electric, locking actuators and one or more second, hydraulic or electric, locking actuators. The one or more first locking actuators are operable to move the one or more locking elements between the locking position and the enabling position independent of the other one of the one or more first and the one or more second locking actuators. This provides for redundancy.

In the above embodiments comprising a locking mechanism it is further preferred if the one or more latching elements each comprise a recessed portion, and the locking mechanism also comprises a rotatable locking shaft which is coupled to the one or more locking actuators such that the locking shaft is rotatable by actuation of the one or more locking actuators to move the one or more locking elements between the locking position and the enabling position. For each of the one or more latching elements, the locking shaft has a locking projection which constitutes one of the one or more locking elements. In the locking position the one or more latching elements engage the recessed portion, and in the enabling position the one or more latching elements do not engage the recessed portion.

In a preferred embodiment, the one or more latching actuators comprise one or more first latching actuators and one or more second latching actuators, each operable to move the one or more latching elements from the latching position into the release position independent of the other one of the one or more first latching actuators and the one or more second latching actuators. In this way, redundancy for increased operational reliability is provided due to two independent power supply systems. For example, each of the first and second latching actuators may be coupled to the common latching shaft, if present.

The tip section pivot axis may be oriented in a direction extending between a first edge and a second edge of the wing opposite to each other in a chord direction of the wing. Alternatively, the tip section pivot axis may be oriented in a direction transverse, and preferably perpendicular, to a plane in which the first edge and the second edge extend.

The wing arrangement according to any of the above-described embodiments may be part of an aircraft. The aircraft further comprises a fuselage. The first end portion of the base section is attached to the fuselage and the base section is arranged between the fuselage and the tip section.

BRIEF DESCRIPTION OF THE DRAWINGS

In the following exemplary embodiments of the present invention will be explained in detail with reference to the drawings.

FIGS. 3a-3c show a detailed view of one embodiment of a latching arrangement.

FIGS. 4a-4d show a detailed view of another embodiment of a latching arrangement, wherein in FIGS. 4b to 4d some elements have been left away for ease of illustration.

DETAILED DESCRIPTION OF THE PREFERRED EMBODIMENTS

Figure 1:
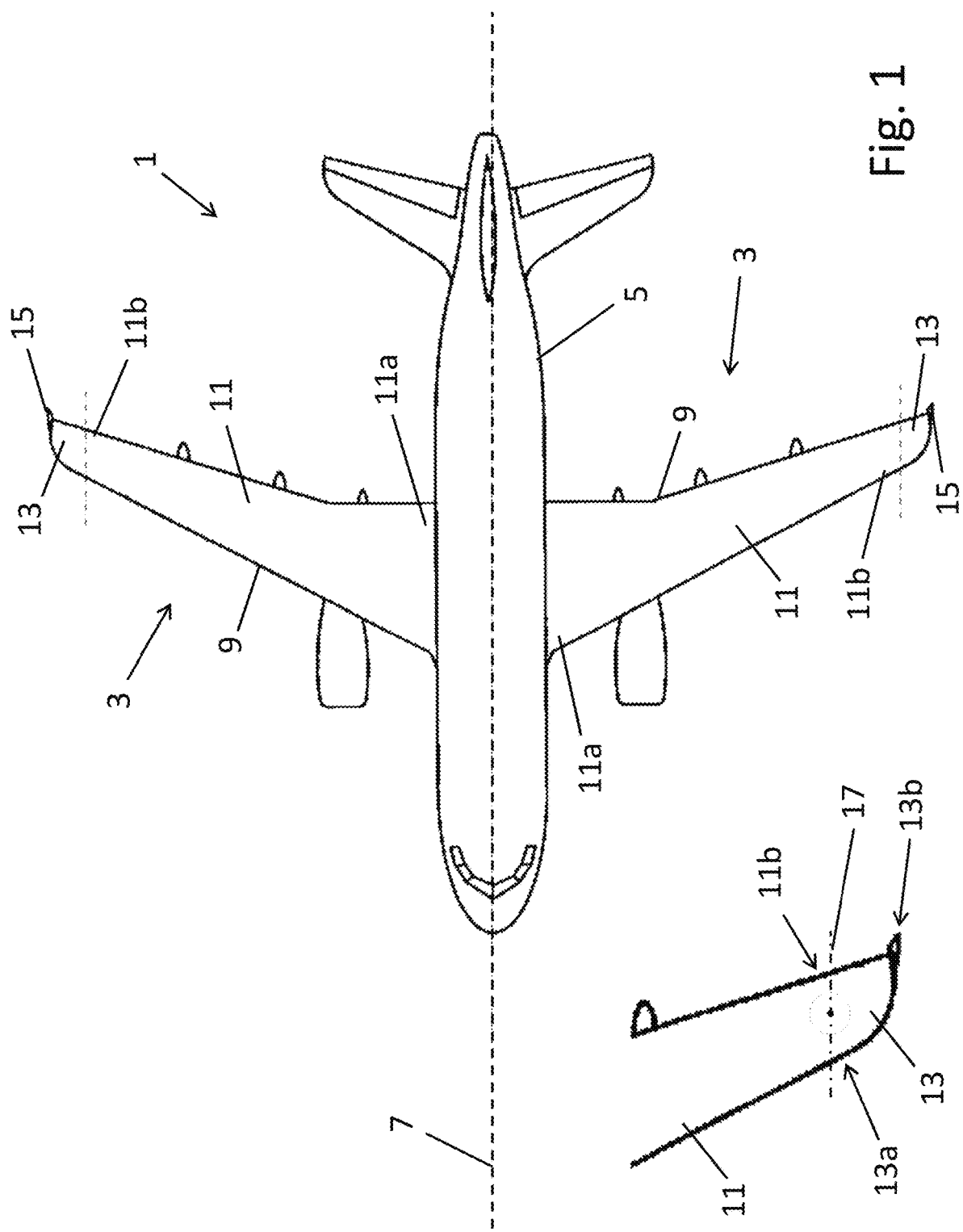
FIG. 1 shows a schematic top view of an aircraft including two wing arrangements according to the embodiments of the present invention, which are secured to opposite sides of the fuselage of the aircraft.

FIG. 1 shows a schematic top view of an aircraft 1 which comprises two wing arrangements 3 according to the present invention. The aircraft 1 also comprises a fuselage 5 extending along a longitudinal axis 7 which corresponds to the x-axis of the aircraft 1. Each of the wing arrangements 3 comprises a wing 9 that extends away from the fuselage 5, and each wing 9 comprises a base section 11 and a tip section 13. The base section 11 has a first or inboard end portion 11a, which is configured or adapted to be coupled to the fuselage 5 and is shown to be coupled to the fuselage 5, and an opposite second or outboard end portion 11b spaced from the fuselage 5 by the remainder of the base section 11.

The tip section 13 of the wing 9 is pivotably connected to the second end portion 11b of the base section 11. More particularly, the tip section 13 extends away from the second or outboard end portion 11*b* of the base section 11 and comprises a third or inboard end portion 13*a* and an opposite fourth or outboard end portion 13*b* spaced from the base section 11 by the remainder of the tip section 13 (as can be seen in the insert of FIG. 1, which shows an outboard end region of one of the wings 9 in enlarged form). The fourth end portion may be provided by a part of a wing tip device 15, which itself is a part of the tip section 13. The third end portion 13*a* is pivotably mounted on or coupled to the second end portion 11*b* of the base section 11 in such a manner that the tip section 13 is able to pivot between a deployed position and a stowed position about a pivot axis 17. In the illustrated embodiments the first tip section position mentioned above is the deployed position, and the second tip section position mentioned above is the stowed position.

The pivot axis 17 generally extends in a direction between a leading edge and a trailing edge of the respective wing 9 and, in the example shown, parallel or essentially parallel to the longitudinal axis 7, i.e., in the flight direction. In the deployed position illustrated in FIG. 1 the tip section 13 extends essentially along the longitudinal axis of the base section 11, and in the stowed position the tip section 13 is angled upwardly with respect to the longitudinal axis of the base section 11, so that the spanwise length of the wing 9 is decreased. Thus, in the deployed position, the fourth end portions or the outermost outboard ends of the tip sections 13 of the wings 9 have a larger distance than in the stowed position, so that the wingspan of the aircraft 1 can be selectively decreased by moving the tip sections 13 of the wings 9 from the deployed position into the stowed position in order to allow for the use of infrastructure adapted to aircraft of such reduced wingspan and in order to save on airport fees, and increased in order to allow for reduced fuel consumption during flight.

Figure 2:
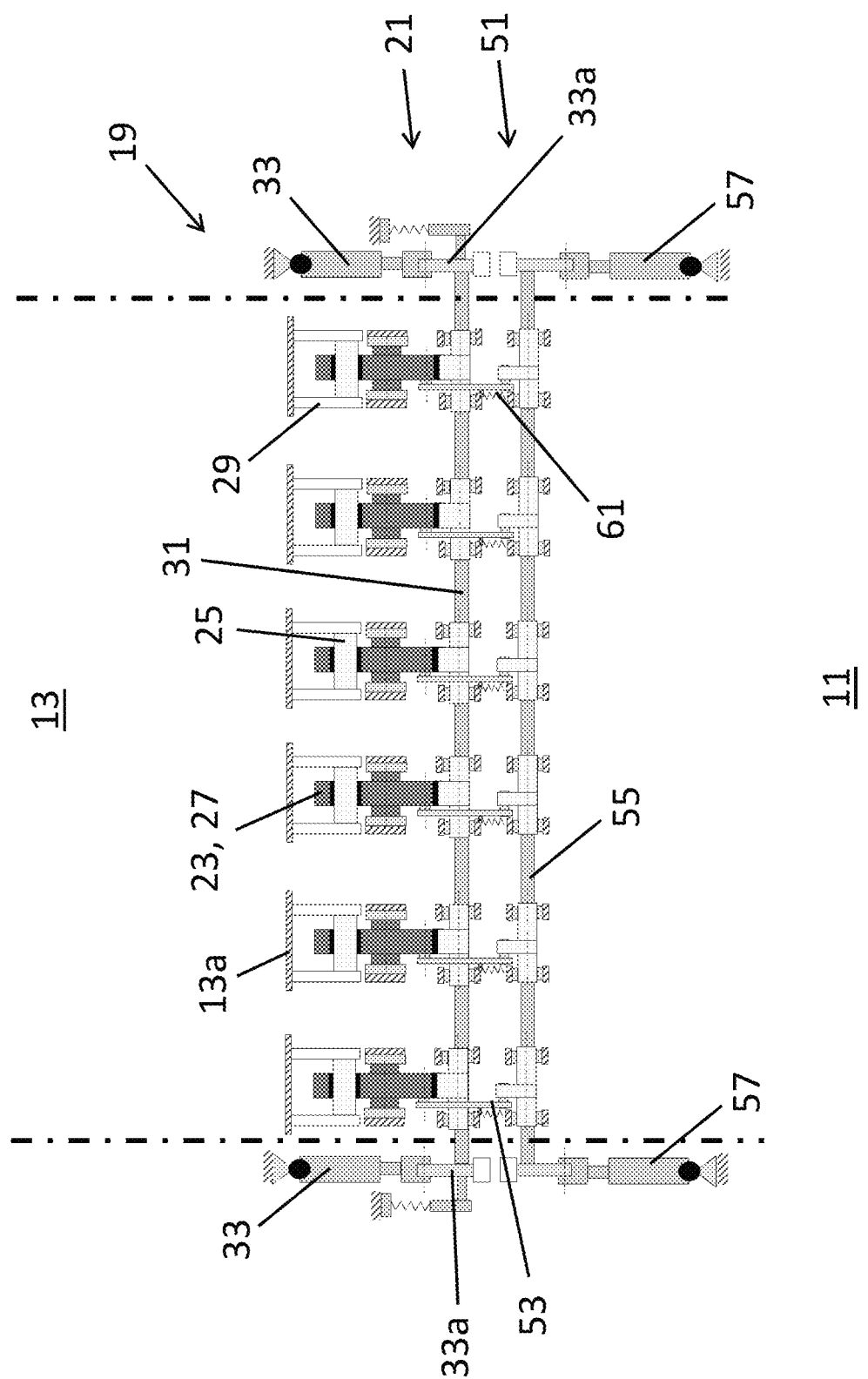
FIG. 2 shows a schematic partial top view of an outboard end portion of an embodiment of the wing arrangement according to the present invention.

In order to effect the pivotal movement of the tip section 13 between the deployed and the stowed positions, each of the wing arrangements 3 comprises an actuating arrangement 19, a part of an embodiment of which is illustrated in FIG. 2. The actuating arrangement 19 comprises one or more actuators (not illustrated), such as, for example, one or more linear hydraulic actuators, which are coupled to the base section 11 and to the tip section 13 and by operation of which the tip section 13 is selectively moved between the deployed position and the stowed position.

Figure 3A:
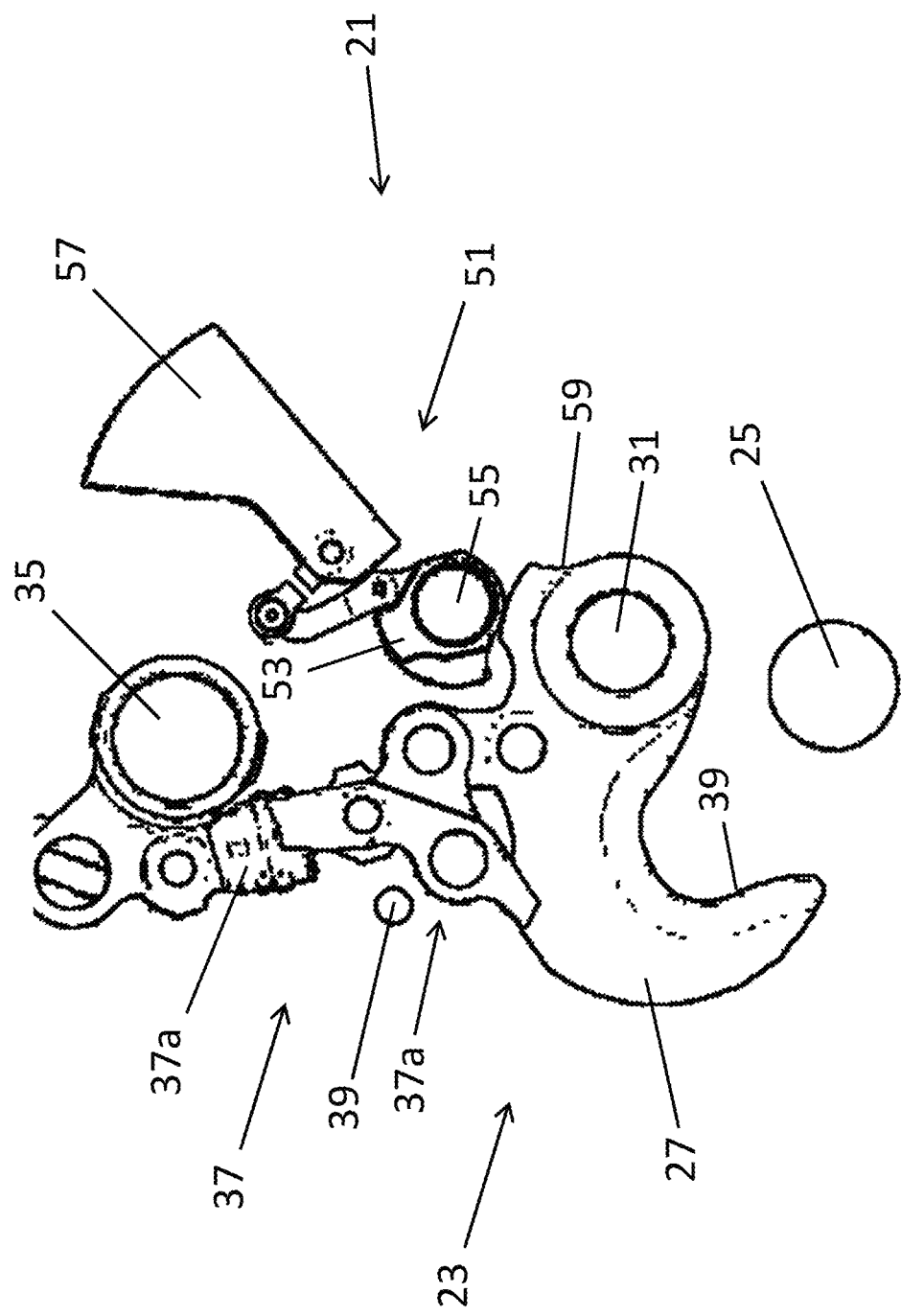

In order to be able to securely maintain the tip section 13 in the deployed position, the actuating arrangement 19 also comprises a latching device or arrangement 21, which is illustrated in FIG. 2 in very broad terms only and two particular embodiments of which are shown in more detail in FIGS. 3*a* to 3*c* and in FIGS. 4*a* to 4*d*, respectively. The latching arrangement 21 comprises a plurality of, e.g., six, hook-shaped latching elements 23 mounted on the base section 11 and a corresponding number of rod-shaped engagement portions 25 carried on the distal ends of associated support elements 29 of the tip section 13. The positions of the latching elements 23 and the engagement portions 25 correspond to each other, so that the latching elements 23 can be selectively brought into and out of latching engagement with the engagement portions 25 in order to latch the tip section 13 in its deployed position or allow movement thereof into the stowed position.

As can best be seen in the two embodiments of the latching arrangement 21 illustrated in FIGS. 3*a* to 3*c* and FIGS. 4*a* to 4*d*, the latching elements 23 each comprise a claw portion 27 and are mounted to a common latching shaft 31, which likewise forms part of the latching device 21 and which is rotatably supported on the base section 11 such that it is rotatable about its longitudinal axis with respect to the base section 11. In the illustrated example, the longitudinal axis extends in the wing span direction, i.e., in a direction between the leading edge and the trailing edge of the wing 9. The latching elements 23 and their claw portions 27 are arranged and dimensioned such that by rotating the latching shaft 31 the latching elements 23 are moved such that the claw portion 27 of each of the latching elements 23 can be selectively brought into and out of engagement with the respective engagement portions 25, thereby selectively allowing and preventing, respectively, the engagement portions 25 to move out of the claw portions 27 and the tip section 13 to move out of the deployed position. This will be explained in more detail below with reference to FIGS. 3*a* to 3*c* and FIGS. 4*a* to 4*d*.

This rotation of the latching shaft 31 can be selectively effected by means of, e.g., two latching actuators 33 provided at the opposite ends of the latching shaft 31 and operatively coupled to the latching shaft 31—either directly or via one or more intermediate coupling elements, e.g., a linkage arrangement and/or an intermediate shaft—such that operation of the latching actuators 33 effects rotation of the latching shaft 31. In this regard, it is to be noted that it is advantageous if the two latching actuators 33 are each adapted to rotate the latching shaft 31 without assistance by the other one of the two latching actuators 33, i.e., if they are independently operable to rotate the latching shaft 31, thereby providing for redundancy. In FIG. 2 the two latching actuators 33 are illustrated in an exemplary manner as linear hydraulic actuators. However, the two latching actuators 33 may also be of another actuator type, such as a linear electric actuator or, as illustrated in the embodiments of FIGS. 3*a* to 3*c* and FIGS. 4*a* to 4*d*, as rotary actuators or motors having a rotating output shaft or as actuators comprising such a rotary actuator or motor.

As will be explained with reference to the embodiments of FIGS. 3*a* to 3*c* and FIGS. 4*a* to 4*d* below, the latching actuators 33 are selectively movable between a first actuator position and a second actuator position. For example, in the case of a linear hydraulic the first actuator position would correspond to a first extension of the piston rod, e.g., the fully extended state, and the second actuator position would correspond to a second extension of the piston rod, e.g., the fully retracted state, and in the case of a rotary actuator having a rotary output element the first actuator position would correspond to a first rotary position of the rotary output element and the second actuator position would correspond to a second rotary position of the rotary output element. In any case, when the latching actuators 33—or one of them if only one of them is used to drive the latching shaft 31—is in the first actuator position, the latching shaft 31 is in a first rotary position in which the latching elements 23 allow the tip section 13 to move into the stowed position, and when the latching actuators 33—or one of them if only one of them is used to drive the latching shaft 31—is in the second actuator position, the latching shaft 31 is in a second rotary position in which the latching elements 23 are positioned to engage the engagement portion and prevent the tip section 13 from moving out of the deployed position. It is to be noted that depending on the particular implementation, the latching shaft 31 may move continuously between the first and second rotary positions when moving the latching actuator or latching actuators 33 between the first and second actuator positions (as in the case of the embodiment illustrated in FIGS. 4*a* to 4*d*) or may move continuously between the first and second rotary positions only during part of the movement of the latching actuator or latching actuators 33 between the first and second actuator positions (as in the case of the embodiment illustrated in FIGS. 3a to 3c).

As will also be explained with reference to the embodiments of FIGS. 3a to 3c and FIGS. 4a to 4d below, the latching arrangement 21 is configured and arranged such that when the tip section 13 is in the deployed position and the latching actuators 33 are in the second actuator position, the latching elements 23 apply a force to the engagement portions 25 such that the tip section 13 is biased away from the stowed position against a tip section stop mechanism 14 (not illustrated in FIG. 2, but shown in FIGS. 4a to 4d), thereby preloading the tip section 13 and preventing unwanted vibrations.

Consequently, when it is desired to move the tip section 13 into the deployed position or out of the deployed position and the latching actuators 33 are not yet in the first actuator position, the latching actuators 33, or at least one of them, are at first operated to move them, or it, into the first actuator position. When the tip section 13 has been moved into the deployed position or, depending on the particular embodiment, an engagement position between the stowed position and the deployed position, and it is desired to latch the tip section 13 in the deployed position, the latching actuators 33, or at least one of them, are operated to move them, or it, into the second actuator position. During this movement of the latching actuator(s) 33 the latching elements 23 move into their latching position and, during their movement engage the engagement portions 25 and force the tip section 13 towards and against the tip section stop mechanism 14 defining the deployed position. Further, during this movement the latching elements 23 may at first move the tip section 13 from the engagement position towards and into the deployed position and only then force the tip section 13 against the tip section stop mechanism 14.

In the embodiment of the latching arrangement 21 illustrated in FIGS. 3a to 3c, the two latching actuators 33 are pivotably coupled with a curved end portion 33a thereof to an intermediate shaft 35, which extends parallel to the latching shaft 31 and which is not shown in the general overview provided by FIG. 2. The coupling is such that movement of one or both of the latching actuators 33 between the first, retracted actuator position shown in FIG. 3a and the second, extended actuator position shown in FIG. 3c effects rotation of the intermediate shaft 35 between corresponding rotary positions of the intermediate shaft 35. The intermediate shaft 35 rotates whenever one or both of the latching actuators 33 are operated.

Each of the latching elements 23 is rigidly secured to the latching shaft 31 such that it rotates together with the latching shaft 31 about the longitudinal axis thereof, which longitudinal axis therefore also constitutes the pivot axis of the latching elements 23. Further, each of the latching elements 23 is separately coupled by a respective coupling arrangement 37 to the intermediate shaft 35, i.e., for each of the latching elements 23 there is an associated coupling arrangement 37 which is disposed and coupled between the respective latching element 23 and the intermediate shaft 35. Each of these coupling arrangements 37 comprises an elastically deformable element 37a and a lever mechanism 37b. The elastically deformable elements 37a, which may, e.g., comprise a spring element or a block of elastically deformable material, constitute an embodiment of the elastically deformable structure generally described above. The coupling arrangements 37 transfer rotary movement of the intermediate shaft 35 to the latching shaft 31 and, thus, to the latching elements 23 in the manner described in further detail below.

FIG. 3a shows the situation when the latching actuators 33—or one of them after it has been moved to the first actuator position independent of the other one of the latching actuators 33—is in the first, retracted actuator position. The rotary position of the intermediate shaft 35 and, thereby, the positions of the elastically deformable elements 37a and the lever mechanism 37 as well as the rotary position of the latching shaft 31 are then such that the latching elements 23 are positioned out of engagement with the associated engagement portions 25, as illustrated in FIG. 3a. The tip section 13 is therefore pivotable between the stowed position and the deployed position.

In order to latch the tip section 13 in the deployed position, the tip section 13 is moved into the deployed position in the situation illustrated in FIG. 3a, and then one or both of the latching actuators 33 is moved from the first actuator position into the second actuator position.

When the latching actuator or actuators 33 begins or begin this movement, the intermediate shaft 35 begins to rotate correspondingly and, in turn, rotates via the coupling arrangement 37 the latching shaft 31 and the latching elements 23, and the rotation of the latching shaft 31 and the latching elements 23 continues upon further movement of the latching actuator or actuators 33 towards the second actuator position. Initially, the latching elements 23 are spaced from the associated engagement portions 25, and only when the latching actuator or actuators 33 reaches or reach a third actuator position between the first and second actuator positions the latching elements 23 engage the engagement portions 25 with a respective engagement surface 39 which is constituted by an interior surface portion of the claw portion 27 of the respective latching element 23. Thus, in this embodiment the deployed position of the tip section 13 constitutes an engagement position of the tip section 13, because upon actuator movement from the first actuator position into the second actuator position the latching elements 23 engage the engagement portions 25 when the tip section 13 is in the deployed position.

Upon further latching actuator movement from the third actuator position towards the second actuator position and a corresponding further rotation of the latching shaft 35 and the latching elements 23, the engagement surface 39 applies an increasing force to the respective engagement portion 25, which forces the tip section 13 against the tip section stop mechanism 14, until the latching actuator or actuators 33 reaches or reach a fourth actuator position between the third and second actuator positions. This situation is illustrated in FIG. 3b. The force increases because the engagement portions 25 move along the engagement surfaces 39 from a location at the mouth of the claw portions 27 into the interior of the claw portions 27 and because the engagement surfaces 39 are shaped such that during the movement along the engagement surfaces 39 the engagement portions 25 moves up a rising ramp provided by the engagement surfaces 39. Due to the increasing force, the elastically deformable elements 37a of the coupling arrangements 37 associated with the latching elements 23 are increasingly deformed elastically.

For each of the latching elements 23 the latching arrangement 21 comprises a latching element stop element 41 which is arranged and adapted to stop movement of the respective latching element 23 through contact with the lever mechanism 37b. In the first and third actuator positions and during a part of the actuator movement from the third actuator position towards the fourth actuator position the lever mechanism 37b is spaced from the stop element 41, as illustrated in FIG. 3a for the first actuator position. However, in an actuator position between the third and fourth actuator positions the lever mechanisms 37b contact the stop elements 41, thereby preventing further movement of the lever mechanisms 37b and, thus, of the latching shaft 31 and the latching elements 23 upon further movement of the latching actuator or actuators 33 towards and into the second actuator position. Consequently, during such further actuator movement the latching shaft 31 and the latching elements 23 remain in their positions shown in FIGS. 3b and 3c, so that the latching element stop elements 41 define the latching positions of the latching elements 23. The latching actuator or actuators 33 and the intermediate shaft 35 are able to continue to move by moving and further elastically deforming the elastically deformable elements 37a, which are pivotably coupled between the intermediate shaft 35 and the lever mechanisms 37b.

The elastic deformation of the elastically deformable elements 37a reaches its maximum in the fourth actuator position. Upon further movement into the second actuator position, the elastically deformable elements 37a are moved from the position shown in FIG. 3b into the position shown in FIG. 3c in which the elastic deformation is lower than in the position of FIG. 3b. Consequently, the force with which the engagement surfaces 39 bias the tip section 13 against the tip section stop mechanism 14 decreases upon actuator movement from the fourth actuator position into the second actuator position.

Thus, in the second actuator position the latching elements 23 are in their latching position, which is defined by the stop elements 41 and which the engagement surfaces 39 bias the tip section 13 against the tip section stop mechanism 14, thereby preventing the tip section 13 from moving out of the deployed position. Further, due to the lower elastic deformation of the elastically deformable elements 37a in the second actuator position as compared to the fourth actuator position, the latching actuator or actuators 33 is or are retained in the second actuator position, and therefore the latching elements 23 in their latching positions, also in the case of a power loss.

In order to unlatch the tip section 13 and enable movement thereof from the deployed position into the stowed position, one or both of the latching actuators 33 is moved from the second actuator position into the first actuator position, whereby the above process is reversed.

In the further embodiment of the latching arrangement 21' illustrated in FIGS. 4a to 4d, the two latching actuators 33' are rotary actuators which are each coupled via a respective link or drive strut 43 to a radially projecting portion 45 of the latching shaft 31'. Each of the links 43 is elongate and pivotably coupled at its two opposite ends to the respective rotary actuator 33' and the respective radially projecting portion 45. Thus, in this embodiment, the rotary actuators 33' are coupled to the latching shaft 31' without an intermediate shaft. The coupling between the latching actuators 33' and the latching shaft 31' is such that movement of one or both of the latching actuators 33' between the first actuator position shown in FIG. 4a and the second actuator position shown in FIG. 4d effects rotation of the latching shaft 31'. The latching shaft 31' rotates whenever one or both of the latching actuators 33' are operated.

Different from the embodiment of FIGS. 3a to 3c, the, e.g., six hook-shaped latching elements 23' are pivotably secured to the latching shaft 31' such that each of the latching elements 23' is pivotable relative to the latching shaft 31', wherein the pivot axis of the latching elements 23' is parallel to but offset from the axis of rotation of the latching shaft 31'. For this purpose, the latching shaft 31' comprises, along its length, six spaced portions 47, the positions of which correspond to the positions of the six latching elements 23'. Each of the latching elements 23' is pivotably connected to another one of the portions 47, and each of the portions 47 is offset from the axis of rotation or longitudinal axis of the latching shaft 31' (see FIGS. 4a to 4d). Consequently, rotation of the latching shaft 31' about its axis of rotation by one or both of the latching actuators 33' effects a movement of the latching element pivot axis along a curved path, namely along a section of a circle having a radius which is equal to the offset between the latching element pivot axis and the axis of rotation of the latching shaft 31'. The latching element pivot axis extends perpendicularly to the plane of FIGS. 4a to 4d through the center of portions 47, which are illustrated in an exemplary manner to have a circular cross-section.

Thus, during movement of one or both of the latching actuators 33' from the first actuator position into the second actuator position the latching element pivot axis of the latching elements 23' moves along a predetermined curved path, and the latching elements 23' carry out a translatory movement defined by the curved path.

Figure 4A:
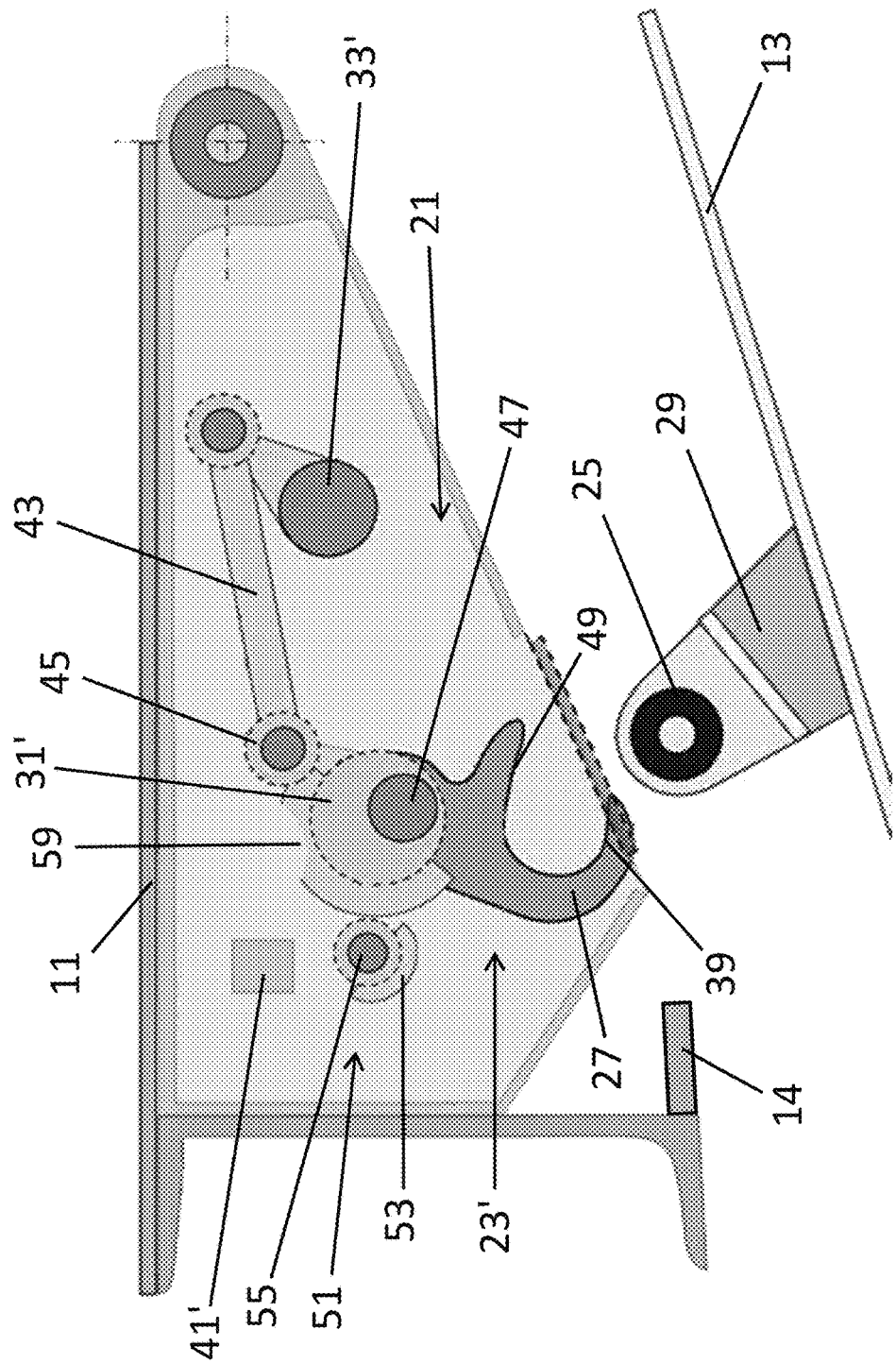

FIG. 4a shows the situation when the latching actuators 33'—or one of them after it has been moved to the first actuator position independent of the other one of the latching actuators 33'—is in the first actuator position. The rotary position of the latching shaft 31' and, thereby, the positions of the offset shaft portions 47 and the latching elements 23' are then such that the associated engagement portions 25 can be moved towards and away from the latching elements 23' into and out of engagement with them, as can be taken from FIG. 4a. The tip section 13 is therefore pivotable between the stowed position and an engagement position, which is between the stowed and deployed positions and which is different from the deployed position.

Figure 4B:
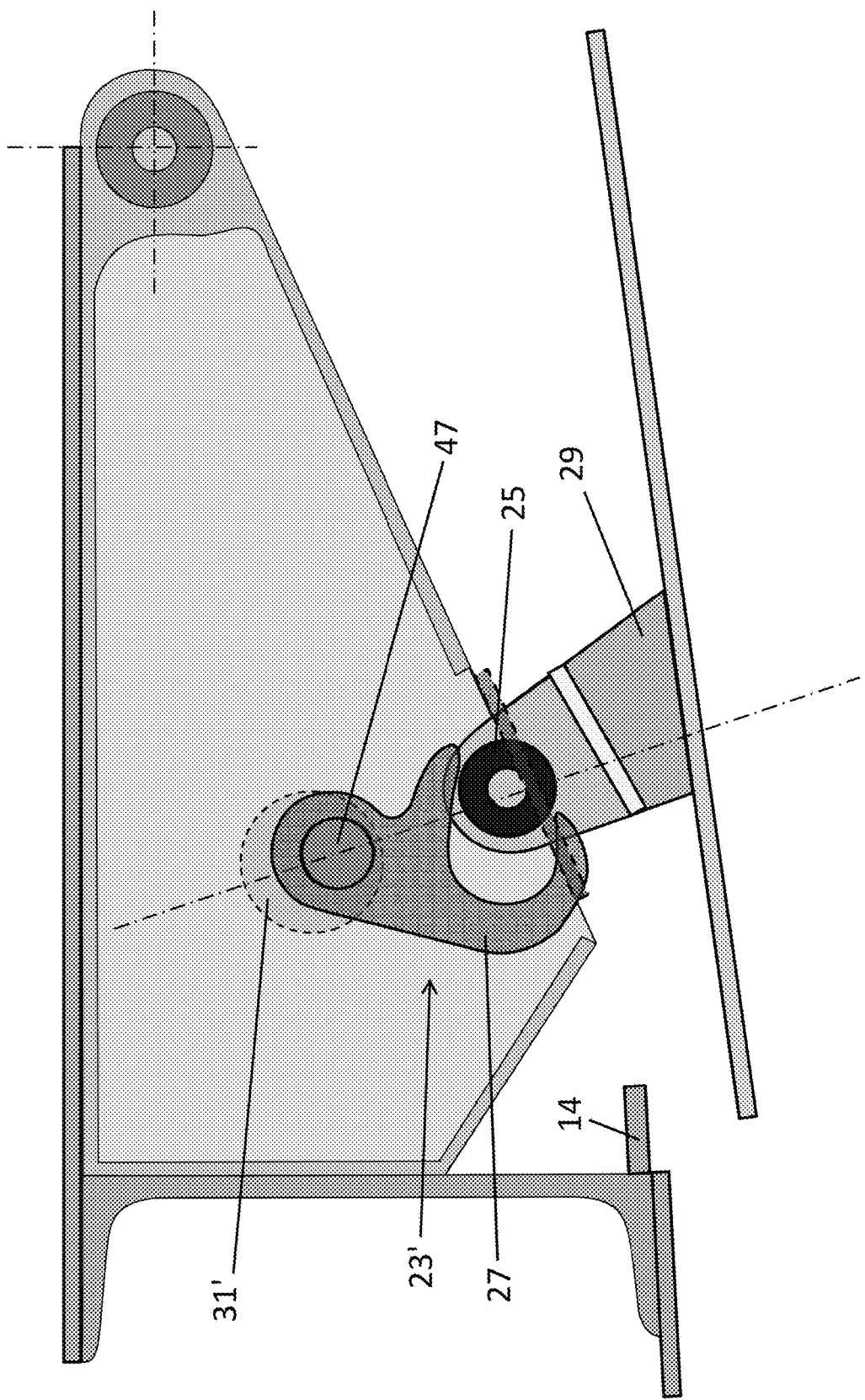
Figure 4C:
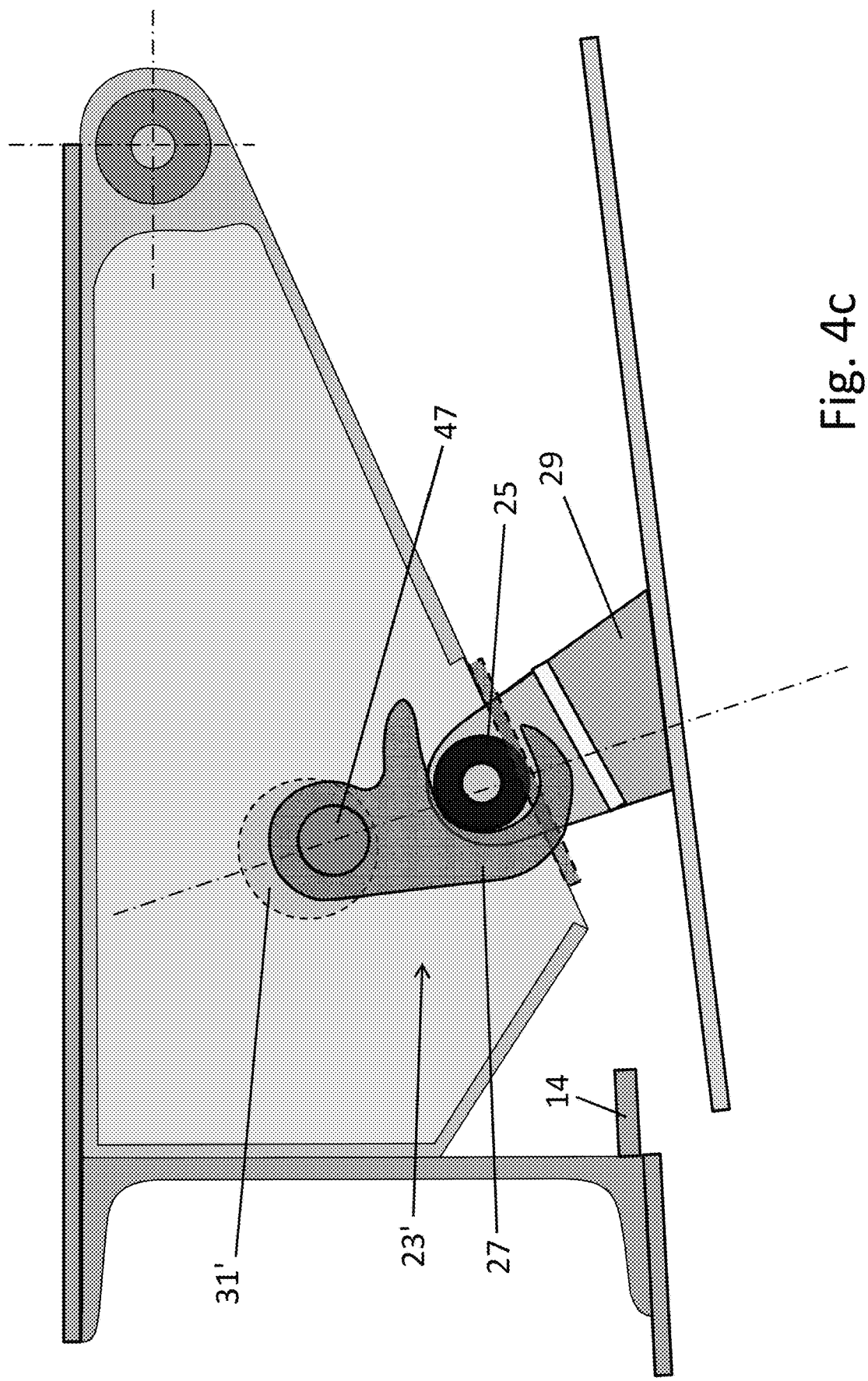

In order to latch the tip section 13 in the deployed position, the tip section 13 is moved, in the situation illustrated in FIG. 4a, into the engagement position. This engagement position is illustrated in FIG. 4c. FIGS. 4b and 4c show that when moving the tip section 13 from the stowed position into the engagement position the engagement portions 25 at first reach a position in which they contact an upper contact surface 49 in the interior of the claw portion 27 of the latching elements 23'. Due to this contact, upon further movement of the tip section 13 into the engagement position of FIG. 4c the latching elements 23' are pivoted about the latching element pivot axis such that the engagement portions 25 move further into the interior of the claw portions 27. It is to be noted that the latching actuators 33' are still in their first actuator position, so that the latching shaft 31' is still in the position corresponding to the first actuator position.

When the latching actuator or actuators 33' begins or begin the movement from the first actuator position into the second actuator position, the latching shaft 33' begins to rotate correspondingly and to move the latching element pivot axis along the curved path, and the rotation of the latching shaft 31' and the movement of the latching element pivot axis continues upon further movement of the latching actuator or actuators 33' towards the second actuator position. Initially, engagement surfaces 39 of the latching elements 23' are spaced from the associated engagement portions 25 (see FIG. 4c), and only when the latching actuator or actuators 33' reaches or reach a third actuator position between the first and second actuator positions the latching elements 23' engage with their engagement surfaces 39 the engagement portions 25. As in the case of the embodiment shown in FIGS. 3a to 3c, each of the engagement surfaces 39 is constituted by an interior surface portion of the claw portion 27 of the respective latching element 23.

Upon further latching actuator movement from the third actuator position towards the second actuator position and a corresponding further rotation of the latching shaft 31' and a corresponding further movement of the latching element pivot axis along the curved path, the engagement surfaces 39 pull the engagement portions 25 upwardly in FIG. 4c until the tip section 13 reaches and abuts the tip section stop mechanism 14. Subsequently, upon further latching actuator movement, the engagement surfaces 39 apply an increasing force to the engagement portions, which forces the tip section 13 against the tip section stop mechanism 14, until the latching actuator or actuators 33' reaches or reach a fourth actuator position between the third and second actuator positions. In the fourth actuator position the latching element pivot axis and the shaft portions 47 are disposed at the highest position along the curved path, i.e., slightly to the right of the position shown in FIG. 4d. The force increases because the shaft portions 47, and therefore also the latching elements 23', move upwardly, so that the tip section 13 is increasingly pulled against the tip section stop mechanism 14. Due to the increasing force, a portion or portions of the tip section 13, such as the engagement portions 25 and/or the support elements 29, and/or a portion or portions of the base section are increasingly deformed elastically. This portion or these portions constitute, in this embodiment, the elastically deformable structure mentioned above. Thus, the curved path is configured such that during a later part of the movement of the latching actuator or actuators 33' from the third actuator position into the fourth actuator position— namely during the part during which the tip section 13 abuts the tip section stop mechanism 14—the engagement surfaces 39 of the latching elements 23' move in a direction of the force applied by them to the respective engagement portion 25 and increasingly force the tip section 13 against the tip section stop mechanism 14.

The elastic deformation of the elastically deformable structure reaches its maximum in the fourth actuator position. Upon further movement into the second actuator position shown in FIG. 4d the latching element pivot axis and the shaft portions 47 are moved along the curved path slightly to the left and downwardly as compared to the fourth actuator position, i.e., into the position shown in FIG. 4d, so that the engagement surfaces 39 move in a direction opposite the force. Therefore, the elastic deformation is lower than in the fourth actuator position. Consequently, the force with which the engagement surfaces 39 bias the tip section 13 against the tip section stop mechanism 14 decreases upon actuator movement from the fourth actuator position into the second actuator position.

For each of the latching elements 23' the latching arrangement 21' comprises a latching element stop element 41' which is arranged and adapted to stop rotary movement of the latching shaft 31' through contact between the projection 45 and the stop element 41'. Different from the embodiment shown in FIGS. 3a to 3c, the latching elements 23' continuously move throughout the latching actuator movement between the first and second actuator positions.

In the second actuator position the latching elements 23' are in their latching position, which is defined by the stop elements 41' and in which the engagement surfaces 39 bias the tip section 13 against the tip section stop mechanism 14, thereby preventing the tip section 13 from moving out of the deployed position. Further, due to the lower elastic deformation of the elastically deformable structure in the second actuator position as compared to the fourth actuator position, the latching actuator or actuators 33' is or are retained in the second actuator position, and therefore the latching elements 23' in their latching positions, also in the case of a power loss.

In order to unlatch the tip section 13 and enable movement thereof from the deployed position into the stowed position, one or both of the latching actuators 33' is moved from the second actuator position into the first actuator position, whereby the above process is reversed.

In all of the above embodiments, the latching arrangement 21, 21' also comprises a locking mechanism 51, which is likewise shown FIGS. 2 to 4d and which is provided in order to be able to further prevent the latching elements 23 to inadvertently leave the latching position. Each of the latching elements 23, 23' is cooperating with an associated locking element 53, and these locking elements 53 form part of the locking mechanism 51. The locking mechanism 51 further comprises a drive or locking shaft 55, which extends parallel to and spaced from the latching shaft 31, 31', and the locking elements 53 are provided as projecting portions radially projecting in an asymmetric manner from the locking shaft 55 (see FIGS. 3a and 4a). The locking elements 53 are selectively movable between a locking position shown in FIG. 3c and an enabling position shown in FIGS. 3a and 4a by rotating the locking shaft 55. For this purpose, the locking mechanism 51 further comprises two locking actuators 57 which are coupled to the two opposite ends of the locking shaft 55 and which are adapted for rotatably driving the locking shaft 55 (see FIG. 2). Each of the two locking actuators 57 is adapted to drive the locking shaft 55 without assistance by the other one of the two locking actuators 57. The two locking actuators 57 may be provided as rotary actuators or motors having a rotating output shaft, or as linear hydraulic actuators, as shown in some more detail in the example of FIG. 2. In addition, it is possible that springs 61 are coupled to the locking elements 53 such that they bias the locking elements 53 into the locking position (see FIG. 2).

The locking mechanism 51 further comprises at each of the latching elements 23, 23' a locking recess 59 which is adapted to receive and be engaged by the locking elements 53 in the locking position, thereby preventing movement of the latching elements 23, 23' out of their latching position. By contrast, in the enabling position the locking elements 53 are out of engagement with the locking recesses 59, thereby allowing movement of the latching elements 23, 23' out of the latching position.

Thus, when the latching elements 23, 23' are in the latching position and the locking elements 53 are moved from the enabling position to the locking position by rotation of the locking shaft 55, the locking elements 53 engage the locking recesses 59 of the latching elements 23, 23' and prevent the latching elements 23, 23' from moving out of the latching position, and when the latching elements 23, 23' are in the latching position and the locking elements 53 are moved from the locking position to the enabling position the latching elements 23, 23' are able to move out of the latching position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing arrangement for an aircraft, comprising:
a wing having
a base section with a first end portion and an opposite second end portion, wherein the first end portion is adapted to be secured to a fuselage of an aircraft, and
a tip section with a third end portion and an opposite fourth end portion, wherein the third end portion is pivotably connected to the second end portion such that the tip section is pivotable about a tip section pivot axis between a first tip section position, which is defined by a first tip section stop mechanism, and a second tip section position, wherein the first tip section position is a deployed position or a stowed position, in which a spanwise length of the wing is smaller than in the deployed position, and the second tip section position is the other one of the deployed position and the stowed position,
a latching arrangement comprising
at least one engagement portion on one of the tip section and the base section,
at least one latching actuator selectively movable between a first actuator position and a second actuator position,
an elastically deformable structure, and
at least one latching element, which has a hook-shaped portion, is secured to the other one of the tip section and the base section to be pivotable with respect thereto about a latching element pivot axis, and is selectively movable between different positions by moving the at least one latching actuator between the first actuator position and the second actuator position, wherein during movement of the at least one latching actuator from the first actuator position into the second actuator position the latching element pivot axis of the at least one latching element moves along a path, so that the at least one latching element carries out a translatory movement defined by the path,
wherein when the at least one latching actuator is in the first actuator position the at least one latching element is in a release position and is positioned such that the tip section is pivotable between the second tip section position and an engagement position, which is located between the second tip section position and the first tip section position or which is equal to the first tip section position,
wherein when the at least one latching actuator is in the second actuator position the at least one latching element is in a latching position in which an engagement surface of each of the at least one latching element engages one of the at least one engagement portion such that the engagement surface applies a force to the respective engagement portion, which biases the tip section against the first tip section stop mechanism, and such that the tip section is prevented from moving towards the second tip section position,
wherein when the tip section is pivoted from the second tip section position into the engagement position with the at least one latching actuator in the first actuator position and the at least one latching actuator is subsequently moved from the first actuator position into the second actuator position the engagement surface of the at least one latching element engages the at least one engagement portion when the at least one latching actuator reaches a third actuator position between the first and second actuator positions, upon further movement of the at least one latching actuator the engagement surface of the at least one latching element applies a force to the respective engagement portion which forces the tip section towards and against the first tip section stop mechanism, wherein over at least part of the movement of the at least one latching actuator from the third actuator position into a fourth actuator position the tip section abuts the first tip section stop mechanism and the force with which the engagement surface biases the tip section against the first tip section stop mechanism increases while the elastically deformable structure is increasingly deformed, and
wherein
the fourth actuator position is equal to the second actuator position, or
the fourth actuator position is between the third and second actuator positions and upon further movement of the at least one latching actuator from the fourth actuator position into the second actuator position the force with which the engagement surface biases the tip section against the first tip section stop mechanism decreases while the elastic deformation of the elastically deformable structure decreases.

2. The wing arrangement according to claim 1, wherein the latching arrangement comprises a rotatable latching shaft to which the at least one latching element and the at least one latching actuator are coupled, such that when moving the at least one latching actuator between the first and second actuator positions the shaft is rotated, thereby effecting the movement of the at least one latching element between the different positions.

3. The wing arrangement according to claim 1, wherein at least one of
the elastically deformable structure comprises a separate element provided between the at least one latching element and each of the at least one latching actuator, or
the elastically deformable structure comprises a portion of the tip section or the base section.

4. The wing arrangement according to claim 1, wherein the path is arranged such that
during movement of the at least one latching actuator from the third actuator position into the fourth actuator position the engagement surface of the at least one latching element moves in a direction of the force applied by the engagement surface to the respective engagement portion and forcing the tip section towards and against the first tip section stop mechanism, and,
if the fourth actuator position is between the third and second actuator positions, during movement of the at least one latching actuator from the fourth actuator position into the second actuator position the engagement surface of the at least one latching element moves in a direction opposite that force.

5. The wing arrangement according to claim 4, wherein the latching arrangement comprises a rotatable latching shaft to which the at least one latching element and the at least one latching actuator are coupled, such that when moving the at least one latching actuator between the first and second actuator positions the shaft is rotated, thereby effecting the movement of the at least one latching element between the different positions, wherein the at least one latching element is pivotably secured to the latching shaft such that the latching element is pivotable relative to the latching shaft and the latching element pivot axis is parallel to but offset from an axis of rotation of the latching shaft, so that rotation of the latching shaft effects the movement of the latching element pivot axis along the path.

6. The wing arrangement according to claim 1, wherein the latching arrangement comprises a latching element stop arrangement defining the latching position of the at least one latching element, wherein upon moving the at least one latching actuator from the first actuator position to the second actuator position the at least one latching element abuts the latching element stop arrangement when the at least one latching actuator is between the third and fourth actuator positions or in the fourth actuator position.

7. The wing arrangement according to claim 1, wherein the engagement portion moves along the engagement surface during at least part of the movement of the at least one latching actuator from the third actuator position into the second actuator position, wherein the engagement surface of the at least one latching element comprises a rising ramp portion which is shaped and arranged such that during at least part of the movement along the engagement surface the engagement portion moves up a rising ramp provided by the rising ramp portion, thereby forcing the tip section towards and against the first tip section stop mechanism.

8. The wing arrangement according to claim 1, wherein the fourth actuator position is between the third and second actuator positions, and wherein the engagement portion moves along the engagement surface during at least part of the movement of the at least one latching actuator from the third actuator position into the second actuator position, including at least part of the movement from the fourth actuator position into the second actuator position, wherein the engagement surface of the at least one latching element comprises a falling ramp portion which is shaped and arranged such that during at least part of the movement of the at least one latching actuator from the fourth actuator position into the second actuator position the engagement portion moves along the engagement surface down a falling ramp provided by the falling ramp portion, thereby relaxing the biasing force exerted by the at least one latching element.

9. The wing arrangement according to claim 1, further comprising
a locking mechanism having at least one locking element which is selectively movable between a locking position and an enabling position,
wherein
when the at least one latching element is in the latching position and the at least one locking element is moved from the enabling position to the locking position the at least one locking element engages the at least one latching element or a component secured thereto and prevents the at least one latching element from moving out of the latching position, and
when the at least one latching element is in the latching position and the at least one locking element is moved from the locking position to the enabling position the at least one latching element is able to move out of the latching position, and
at least one locking actuator operable to move the at least one locking element between the locking position and the enabling position.

10. The wing arrangement according to claim 9, wherein the at least one locking actuator comprises at least one first locking actuator and at least one second locking actuator, each operable to move the at least one locking element between the locking position and the enabling position independent of the other one of the at least one first and at least one second locking actuator.

11. The wing arrangement according to claim 9, wherein the at least one latching element comprises a recessed portion, and the locking mechanism further comprises a rotatable locking shaft coupled to the at least one locking actuator such that the locking shaft is rotatable by actuation of the at least one locking actuator to move the at least one locking element between the locking position and the enabling position, wherein for each of the at least one latching element the locking shaft has a locking projection constituting one of the at least one locking element and engaging the associated recessed portion in the locking position.

12. The wing arrangement according to claim 1, wherein the at least one latching actuator comprises at least one first latching actuator and at least one second latching actuator, each operable to move the at least one latching element from the latching position into the release position independent of the other one of the at least one first and at least one second latching actuator.

13. The wing arrangement according to claim 1, wherein the tip section pivot axis is oriented in a direction extending between a first edge and a second edge of the wing opposite to each other in a chord direction of the wing, or the tip section pivot axis is oriented in a direction transverse to a plane in which the first edge and the second edge extend.

14. An aircraft comprising
a fuselage, and
the wing arrangement according to claim 1,
wherein the first end portion of the base section is attached to the fuselage and the base section is arranged between the fuselage and the tip section.

* * * * *